United States Patent
Scharmüller et al.

(10) Patent No.: US 12,485,714 B2
(45) Date of Patent: Dec. 2, 2025

(54) COUPLING SOCKET

(71) Applicants: Josef Scharmüller, Fornach (AT); Josef Scharmüller, Jr., Vöcklamarkt (AT); Christine Scharmüller, Fornach (AT)

(72) Inventors: Josef Scharmüller, Fornach (AT); Josef Scharmüller, Jr., Vöcklamarkt (AT); Christine Scharmüller, Fornach (AT)

( * ) Notice: Subject to any disclaimer, the term of this patent is extended or adjusted under 35 U.S.C. 154(b) by 550 days.

(21) Appl. No.: 17/769,797

(22) PCT Filed: Oct. 1, 2020

(86) PCT No.: PCT/EP2020/077573
§ 371 (c)(1),
(2) Date: Apr. 18, 2022

(87) PCT Pub. No.: WO2021/073892
PCT Pub. Date: Apr. 22, 2021

(65) Prior Publication Data
US 2022/0388357 A1  Dec. 8, 2022

(30) Foreign Application Priority Data
Oct. 16, 2019 (AT) .............................. A 50888/2019

(51) Int. Cl.
*B60D 1/58* (2006.01)
*B60D 1/06* (2006.01)

(52) U.S. Cl.
CPC .............. *B60D 1/586* (2013.01); *B60D 1/06* (2013.01)

(58) Field of Classification Search
CPC ... F16C 11/06; F16C 11/0619; F16C 11/0623; F16C 11/0633; F16C 11/0638; F16C 11/0642; F16C 11/0657; B60D 1/06
See application file for complete search history.

(56) References Cited

U.S. PATENT DOCUMENTS 3,155,406 A * 11/1964 Gottschald ............ F16C 11/069
                                                    403/135
3,210,105 A * 10/1965 Vogt ........................ F16C 11/06
                                                    403/140
(Continued)

FOREIGN PATENT DOCUMENTS

DE        2235874 A1      2/1974
DE       20116970 U1      2/2003
(Continued)

OTHER PUBLICATIONS

Office Action in Austria Application No. A 50888/2019, mailed Apr. 3, 2020, 2 pages.
(Continued)

*Primary Examiner* — Jonathan P Masinick
(74) *Attorney, Agent, or Firm* — Liang & Hennessey LLP; Brian Hennessey

(57) ABSTRACT

A coupling socket for coupling to a coupling ball. The coupling socket has a concave coupling receiving area with a main insertion direction for the coupling ball, and a substantially semispherical lubricant cap with an end face edge is arranged in the coupling receiving area, wherein the convex exterior of the lubricant cap contacts the inner wall of the coupling receiving area over the surface thereof, and the concave interior of the lubricant cap has a receiving area for the coupling ball. The coupling socket has an insertion aid in the coupling receiving area, the end face edge of the lubricant cap, when viewed in the main insertion direction, is located behind the insertion aid, and the insertion aid completely covers the end face edge of the lubricant cap.

14 Claims, 2 Drawing Sheets

(56) References Cited

U.S. PATENT DOCUMENTS

| | | | | |
|---|---|---|---|---|
| 3,269,758 | A | * | 8/1966 | Ulderup ............... F16C 11/0609 403/140 |
| 3,787,127 | A | * | 1/1974 | Cutler ................. F16C 11/0638 403/140 |
| 3,862,807 | A | | 1/1975 | Doden et al. |
| 3,967,907 | A | * | 7/1976 | Schmidt ................... B62D 7/16 403/140 |
| 4,231,673 | A | * | 11/1980 | Satoh .................. F16C 11/0633 403/135 |
| 4,318,627 | A | * | 3/1982 | Morin .................. F16C 11/0638 403/140 |
| 4,615,638 | A | * | 10/1986 | Ito ....................... F16C 11/0638 403/135 |
| 4,695,181 | A | * | 9/1987 | Rahmede ............ F16C 11/0638 403/135 |
| 5,672,024 | A | * | 9/1997 | Maughan ................. B62D 7/16 403/135 |
| 7,510,344 | B2 | * | 3/2009 | Kondoh .............. F16C 11/0619 403/135 |
| 9,476,447 | B2 | * | 10/2016 | Schmidt ................. B60G 7/005 |
| 11,078,952 | B2 | * | 8/2021 | Sieve ................. F16C 11/0623 |
| 11,542,981 | B2 | * | 1/2023 | Doherty ................. B60G 7/005 |
| 2006/0140711 | A1 | * | 6/2006 | Morales Arnaez .......................... F16C 11/0638 403/122 |
| 2007/0140783 | A1 | | 6/2007 | O'Bryan et al. |
| 2018/0252259 | A1 | * | 9/2018 | Englebright .......... F16C 11/086 |
| 2019/0070920 | A1 | * | 3/2019 | Kuroda .................... B60G 7/00 |
| 2019/0291525 | A1 | * | 9/2019 | Lee ........................ B60G 7/005 |

FOREIGN PATENT DOCUMENTS

| | | | | |
|---|---|---|---|---|
| DE | 102011076161 | A1 | * | 11/2012 .......... F16C 11/0642 |
| DE | 102019116034 | A1 | * | 12/2020 ....... B29C 45/14491 |
| EP | 0082638 | A1 | * | 6/1983 |
| EP | 2682290 | A1 | | 1/2014 |
| FR | 903599 | A | | 10/1945 |
| GB | 839396 | A | * | 6/1960 |
| GB | 938256 | A | * | 10/1963 |
| KR | 20070035267 | A | * | 3/2007 |
| KR | 20090019927 | A | * | 2/2009 |
| KR | 101067602 | B1 | * | 9/2011 |
| WO | 02086339 | A1 | | 10/2002 |
| WO | WO-2006019145 | A1 | * | 2/2006 ............. F16C 11/069 |
| WO | WO-2011021217 | A1 | * | 2/2011 ........... F16C 11/0628 |
| WO | WO-2019033218 | A1 | * | 2/2019 ............... F16C 11/06 |
| WO | WO-2019117627 | A1 | * | 6/2019 ............... B60G 7/00 |
| WO | WO-2020203479 | A1 | * | 10/2020 |
| WO | WO-2021010375 | A1 | * | 1/2021 |

OTHER PUBLICATIONS

International Search Report and Written Opinion in International Application No. PCT/EP2020/077573, mailed Dec. 9, 2020, 15 pages.

* cited by examiner

COUPLING SOCKET

CROSS-REFERENCE TO RELATED APPLICATIONS

The present application is a national phase application of PCT Application No. PCT/EP2020/077573, filed Oct. 1, 2020, entitled "COUPLING SOCKET", which claims the benefit of Austrian Patent Application No. A 50888/2019, filed Oct. 16, 2019, each of which is incorporated by reference in its entirety.

BACKGROUND OF THE INVENTION

1. Field of the Invention

The invention relates to a coupling socket.

2. Description of the Related Art

It is well known that liquid lubricants such as greases or oils, powdered lubricants such as graphite, or lubricants in the form of solid components are used in ball couplings to reduce the frictional resistance between the coupling socket and the coupling ball and to prevent possible wedging of the coupling ball in the coupling socket.

Typically, such a solid component in the form of a cap is form-fittingly fastened in the coupling socket. For this purpose, the coupling socket can have a groove into which the cap engages with a projection projecting from the in particular semicircular or spherical cap-shaped body of the cap. In the following, a cap-shaped solid lubricant component is referred to as a lubricant cap.

A disadvantage of this is that this method of fastening the lubricant cap in the coupling socket requires a high degree of dimensional accuracy. Both the groove and the projection must be precisely aligned to ensure that the lubricant cap is form-fittingly arranged in the coupling socket. Surprisingly, it has been shown that a clearance often remains between the area of the pole of the lubricant cap and the coupling socket due to dimensional inaccuracies. Even very small dimensional inaccuracies are sufficient to create this clearance between the coupling socket and the lubricant cap. Here, the region of the pole of the lubricant cap is a region of the smallest radius of the great circle of the lubricant cap. Great circles of the lubricant cap may also be referred to as latitudes of the lubricant cap. In coupling operation, especially when working in the field, or driving over speed bumps, it happens that vertical impacts of the coupling ball against the area of the pole of the lubricant cap take place and due to this high load or due to the forces of the impacts, the projection of the lubricant cap is damaged, since the projection has to absorb these forces in order to hold the lubricant cap in the coupling socket. Generally, when the lubricant cap is arranged in the coupling socket, an end face edge of the lubricant cap is exposed and not protected against impacts. As a result, the lubricant cap can easily be damaged when the coupling ball is inserted into the coupling socket or when the coupling socket is placed on the coupling ball during the coupling process. The lubricant cap can be severely damaged, particularly in the case of high support loads, such as those that occur in the coupling operation of an agricultural vehicle with a trailer.

Due to the form-fit fastening of the lubricant cap in a groove, the lubricant cap can thus be easily damaged, resulting in a short service life of the lubricant cap and a high maintenance requirement of the ball coupling.

SUMMARY OF THE INVENTION

According to the invention, the object is achieved a coupling socket for coupling to a coupling ball including a concave coupling receiving area with a main insertion direction for the coupling ball. The coupling socket also includes a substantially semispherical lubricant cap with an end face edge arranged in the coupling receiving area. A convex exterior of the lubricant cap is in surface contact with an inner wall of the coupling receiving area. A concave interior of the lubricant cap has a receiving area for the coupling ball. The coupling socket includes an insertion aid in the coupling receiving area. The end face edge of the lubricant cap, when viewed in the main insertion direction, is located behind the insertion aid. The insertion aid completely covers the end face edge of the lubricant cap.

This results in the advantage that a longer service life of the lubricant cap and thus a low maintenance requirement of the ball coupling are made possible. Due to the fact that the end face edge of the lubricant cap—when viewed in the main insertion direction—is arranged behind the insertion aid, the end face edge of the lubricant cap cannot be damaged when the coupling ball is inserted or when the coupling socket is placed on the coupling ball. Since the insertion aid completely covers the end face edge of the lubricant cap, it cannot be worn or damaged by vertical impacts during operation and during the coupling process. In the event of impacts during operation, i.e. in the coupled state, the energy is distributed over the entire lubricant cap, which means that it has no weak points caused by fastening projections that engage, for example, in a groove. Particularly in the case of high support loads, the rimless design of the lubricant cap in the coupling socket has a particularly favorable effect, enabling a significantly extended service life of the lubricant cap and reducing the need for maintenance of the ball coupling.

The dependent claims relate to further advantageous embodiments of the invention.

Express reference is hereby made to the wording of the patent claims, whereby the patent claims are incorporated herein by reference into the description and are deemed to be reproduced verbatim.

The advantage in the event that an inner rim of the lubricant cap adjacent the end face edge is supported on the insertion aid is that tilting of the lubricant cap into or out of the coupling socket is avoided. Tilting of the lubricant cap in the coupling socket may cause severe damage to the lubricant cap during impact and relative movement in multiple axes.

BRIEF DESCRIPTION OF THE DRAWINGS

The invention is described in more detail with reference to the accompanying drawings, in which only preferred embodiments are shown by way of example. In the drawings.

DETAILED DESCRIPTION

Figure 1:
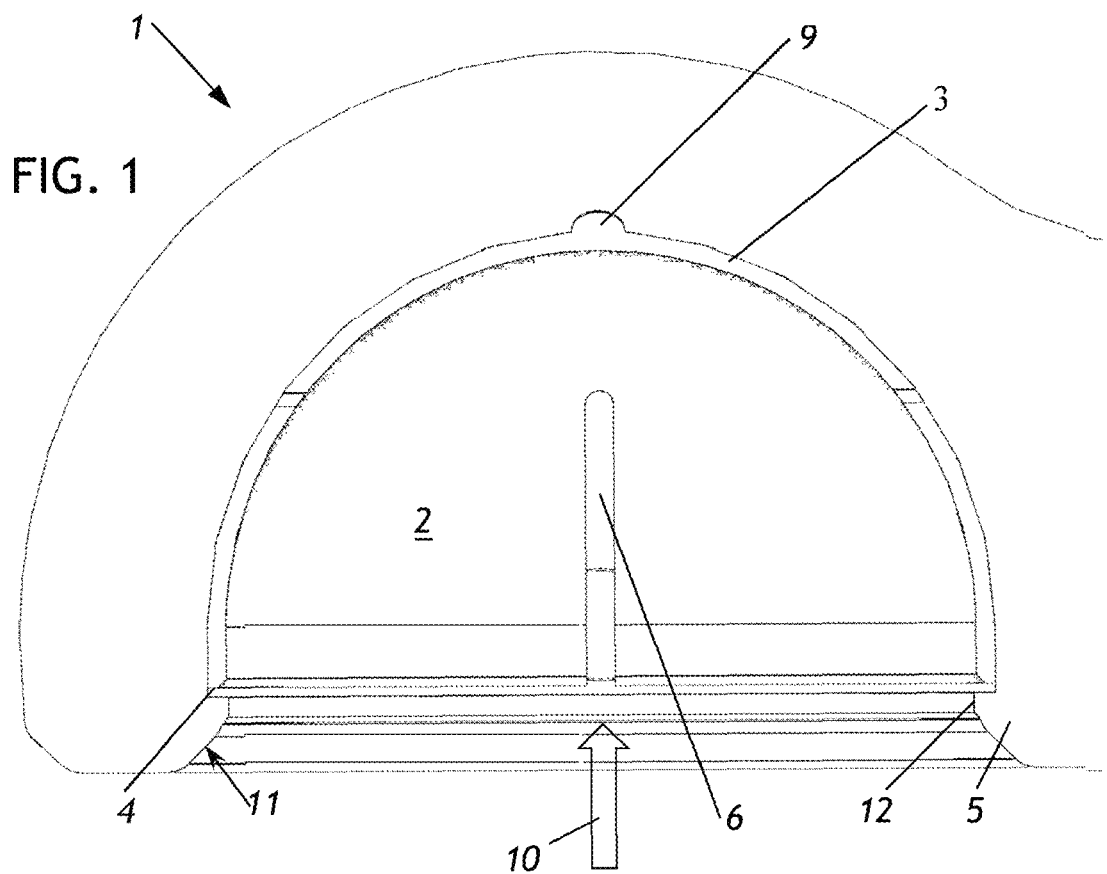
FIG. 1 shows a longitudinal section through the coupling socket.
Figure 2:
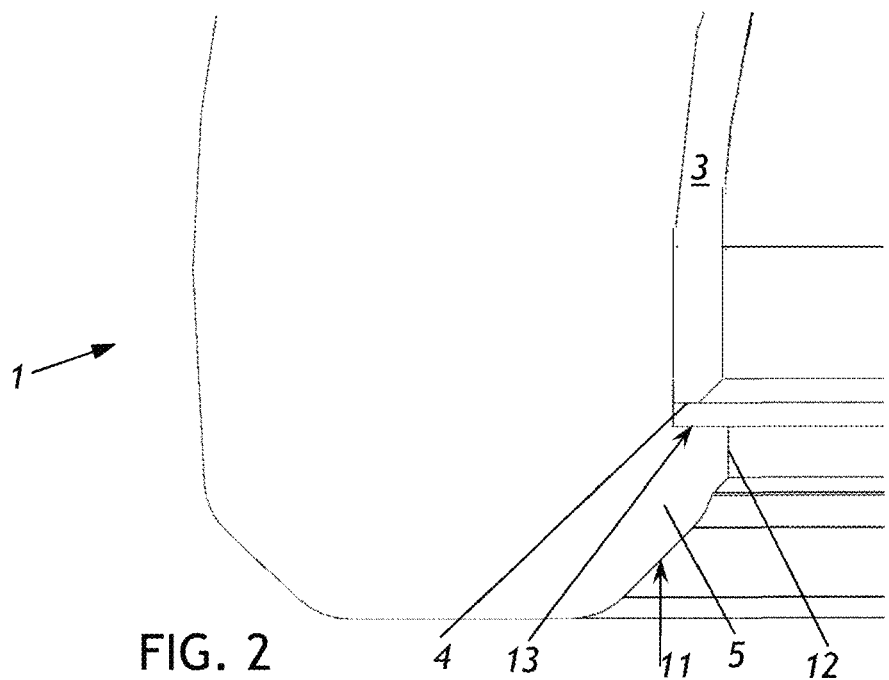
FIG. 2 shows a detailed view of the coupling socket.
Figure 3:
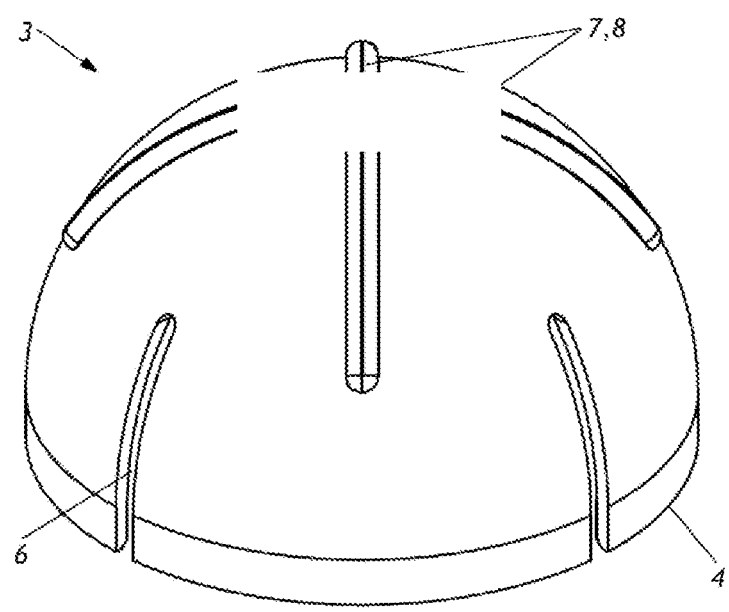
FIG. 3 shows a perspective view of the lubricant cap.

FIGS. 1 to 3 show at least parts of a preferred embodiment of a coupling socket 1 for coupling with a coupling ball, the coupling socket 1 having a concave coupling receiving area 2 with a main insertion direction 10 for the coupling ball, a substantially semispherical lubricant cap 3 with an end face edge 4 being arranged in the coupling receiving area 2, the lubricant cap 3 being in surface contact with an inner wall of the coupling receiving area 2 on its convex exterior and having a receiving area for the coupling ball on its concave interior, the coupling socket 1 having an insertion aid 5 in the coupling receiving area 2, the end face edge 4 of the lubricant cap 3—when viewed in the main insertion direction 10—being arranged behind the insertion aid 5, and the insertion aid 5 completely covering the end face edge 4 of the lubricant cap 3.

The coupling socket 1 is used in particular in a vehicle coupling for the agricultural sector, i.e. for coupling a tractor to an agricultural trailer. The coupling socket 1 has a concave coupling receiving area 2 with a main insertion direction 10 for the coupling ball. The inner surface of the coupling socket 1 is in particular of partially spherical design. The main insertion direction 10 is the direction or angle in which the coupling ball is inserted into the coupling socket 1 or in which the coupling socket 1 is placed on the coupling ball. The main insertion direction 10 is in particular normal to a horizontal plane of the coupling socket 1, which plane is spanned by a latitude extending at the insertion aid 5 or at the end face edge 4 of the lubricant cap 3, the main insertion direction 10 pointing in the direction of the region of the pole of the lubricant cap 3 or of the coupling receiving area 2, which is exemplarily shown in FIG. 1.

Here, the region of the pole of the coupling receiving area 2 is a region of the smallest radius of the great circle of the coupling receiving area 2.

A tolerance is provided with respect to the angle of the main insertion direction 10. This means that, in practice, it is not always possible to position the coupling socket 1 exactly above the coupling ball during the coupling process. Accordingly, it may happen that the coupling socket 1 is pushed or placed onto the coupling ball at an angle that is oblique with respect to the main insertion direction 10.

The coupling socket 1 comprises a base body. Preferably, the base body may comprise a socket section including the coupling receiving area 2, to which socket section a shank is integrally formed. The coupling receiving area 2 has an inner wall. The shank may also be integrally formed on a mounting plate, which is formed for mounting the coupling socket 1 on a trailer.

Preferably, the base body of the coupling socket 1 is formed of a metal.

It may further be preferably provided that the base body is formed of an alloy, in particular of steel.

The lubricant cap 3 is formed in particular in a semispherical shape and has an end face edge 4. It may also be provided that at least the exterior of the lubricant cap 3 is formed to be partially spherical. In particular, the lubricant cap 3 may have a straight surface in a region of the end face edge 4. In particular, the end face edge 4 is of substantially circumferential design. It is provided that the convex exterior of the lubricant cap 3 is in surface contact with the inner wall of the coupling receiving area 2, while the concave interior of the lubricant cap 3 has a receiving area for the coupling ball.

The coupling socket 1 has an insertion aid 5 in the coupling receiving area 2. The insertion aid 5 is preferably a projection projecting from the coupling socket 1 into the coupling receiving area 2. The insertion aid 5 may preferably be integrally formed with the coupling socket 1. The insertion aid 5 may also be integrally formed with the coupling socket 1.

Particularly preferably, the inner wall of the coupling receiving area 2 extends from the insertion aid 5 in a substantially continuous and semispherical manner in the direction of the pole of the coupling receiving area 2. Preferably, there are thus no indentations or grooves in an immediately adjacent region of the insertion aid 5. However, this does not mean that the entire inner wall of the coupling receiving area 2 may have no recesses, but rather that no recesses are arranged in the immediately adjacent region to the insertion aid 5.

The insertion aid 5 is formed in the coupling receiving area 2, in particular circumferentially. Particularly preferably, the insertion aid 5 surrounds an insertion opening of the coupling receiving area 2 in an annular manner. The insertion opening of the coupling receiving area 2 is the opening of the coupling receiving area 2 into which the coupling ball is inserted during the coupling process.

The insertion aid 5 may preferably have a sliding surface 11. The sliding surface 11 may in particular be a surface arranged obliquely to the main insertion direction 10. The sliding surface 11 facilitates the placement of the coupling socket 1 on the coupling ball or the insertion of the coupling ball into the coupling socket 1. The sliding surface 11 allows the coupling socket 1 to be easily slid over or placed on the coupling ball. During coupling operation at an angle deviating from the main insertion direction 10, the coupling socket 1 or the coupling ball slides along the sliding surface 11 until the coupling socket 1 can be placed on the coupling ball in the main insertion direction 10, or until the coupling ball can be inserted into the coupling receiving area 2.

The insertion aid 5 preferably has a shoulder rim 12 adjacent to the sliding surface 11 and parallel to the main insertion direction 10.

It is further provided that the end face edge 4 of the lubricant cap 3—when viewed in the main insertion direction 10—is arranged behind the insertion aid 5, and that the insertion aid 5 completely covers the end face edge 4 of the lubricant cap 3, which is exemplarily shown in FIGS. 1 and 2. Thus, when viewed in the main insertion direction 10, the end face edge 4 of the lubricant cap 3 is not visible in the coupling socket 1.

This results in the advantage that a longer service life of the lubricant cap 3 and thus a lower maintenance requirement of the ball coupling are made possible. Due to the fact that the end face edge 4 of the lubricant cap 3—when viewed in the main insertion direction 10—is arranged behind the insertion aid 5, the end face edge 4 of the lubricant cap 3 cannot be damaged when the coupling ball is inserted or when the coupling socket 1 is placed on the coupling ball. Since the insertion aid 5 completely covers the end face edge 4 of the lubricant cap 3, it cannot be worn or damaged by vertical impacts during operation and during the coupling process. In the event of impacts during operation, i.e. in the coupled state, the energy is distributed over the entire lubricant cap 3, as a result of which the latter has no weak points caused by fastening projections which engage in a groove, for example. Particularly in the case of high support loads, the rimless design of the lubricant cap 3 in the coupling socket 1 has a particularly favorable effect, enabling a significantly extended service life of the lubricant cap 3 and reducing a need for maintenance of the ball coupling.

In a coupled state, the coupling socket 1 is placed on the coupling ball of a coupling part, thereby forming a connection between the coupling part and the coupling socket 1 that can be pivoted about three axes. In a coupled state, the concave interior of the lubricant cap 3 contacts part of the surface of the coupling ball.

It may be preferably provided that an inner rim of the lubricant cap 3 adjacent to the end face edge 4 is supported on the insertion aid 5, which is not shown in the figures.

It may also be preferably provided that the end face edge 4 is substantially supported on the insertion aid 5, which is not shown in figures. Rather, in FIGS. 1 and 2, the play is shown to be oversized. This ensures a good retention of the lubricant cap 3 in the coupling socket 1 and prevents the lubricant cap 3 from accidentally slipping out of the coupling socket 1.

It may be preferably provided that the lubricant cap 3 has a surface arranged adjacent and at an angle to the end face edge 4, which further facilitates placement of the coupling socket 1 on the coupling ball or insertion of the coupling ball into the coupling socket 1.

The insertion aid 5 may particularly preferably comprise a substantially planar support surface 13 for support for the end face edge 4 and/or for the inner rim adjacent to the end face edge 4.

The support surface 13 may preferably be adjacent to the shoulder edge 12 and form a substantially right angle with the shoulder edge 12.

The advantage of supporting the inner rim adjacent to the end face edge 4 on the insertion aid 5 is that the edge is not exposed to impacts and loads occurring during the coupling process or during operation, and thus the risk of damage to this rim is greatly reduced.

The advantage of supporting the end face edge 4 on the support surface 13 is that tilting of the lubricant cap 3 in or out of the coupling socket 1 is avoided. In the event of impacts and relative movements, in particular in a plurality of axes, tilting of the lubricant cap 3 in the coupling socket 1 can cause severe damage to the lubricant cap 3, as a result of which the cap must be replaced.

It may be preferably provided that the lubricant cap 3 comprises at least one polymer. In particular, the polymer may be a semi-crystalline or highly crystalline polymer. In particular, the polymer may comprise a polyamide or a polyaramide.

Particularly preferably, it may be provided that the lubricant cap 3 comprises at least one slot 6 at the end face edge 4. By means of the slot 6, the lubricant cap 3 can be easily introduced or inserted into the coupling receiving area 2 and be also removed again by compressing the lubricant cap 3, in particular the end face edge 4 of the lubricant cap 3. A lubricant cap 3 with at least one slot 6 is shown by way of example in FIG. 3.

For a particularly simple insertion and for a particularly simple removal of the lubricant cap 3 into or from the coupling receiving area 2, it can preferably be provided that the lubricant cap 3 has a plurality of slots 6, in particular arranged at equal distances from one another. Preferably, the multiple slots 6 are arranged on the end face edge 4 of the lubricant cap 3. It is particularly preferred that the end face edge 4 is perforated by means of the slots 6.

It may be preferably provided that the lubricant cap 3 has three, in particular four, preferably six, slots 6.

Due to the increased number of slots 6, the lubricant cap 3 can be compressed even more easily and can thus be removed or inserted particularly well.

The at least one slot 6 is in particular an elongated recess or opening in the lubricant cap 3. Preferably, the at least one slot 6 is arranged normal to a great circle of the lubricant cap 3. In other words, it is preferred that the at least one slot 6 extends along a longitude of the lubricant cap 3. A longitude of the lubricant cap 3 extends from the pole of the lubricant cap 3 in the direction towards the end face edge 4 of the lubricant cap 3. A plurality of slots 6 are in particular arranged such that each slot 6 has the greatest possible geometric distance on the lubricant cap 3 with respect to its neighboring slots 6.

It may be preferably provided that the at least one slot 6 extends over at least 30%, in particular at least 50%, preferably at least 70%, of the length along a degree of longitude from the end face edge 4 to the pole of the lubricant cap 3.

In order to enable a particularly good retention of the lubricant cap 3 in the coupling receiving area 2, in particular during operation, it can be provided in a particularly preferred manner that the lubricant cap 3 has an anti-rotation means 7 with respect to the coupling receiving area 2. During operation means here that the coupling socket 1 is coupled to the coupling ball and a tractor vehicle is connected to a trailing vehicle or trailer by means of this ball coupling.

In particular, it may be provided that the anti-rotation means 7 is arranged on the exterior of the lubricant cap 3.

Particularly preferably, it can be provided that the anti-rotation means 7 is designed as at least one rib 8, which enables a simple manufacture of the anti-rotation means 7.

It frequently happens that a coupling socket 1 has a cross-shaped recess for receiving lubricants, in particular grease-containing or pasty lubricants. Advantageously, this recess can act as a receiving area 9 for the at least one rib 8.

Particularly preferably, it may be provided that the at least one rib 8 is arranged along a longitude on the lubricant cap 3.

It may be preferably provided that the at least one rib 8 extends over at least 30%, in particular at least 50%, preferably at least 70%, of the length along a longitude from the pole to the end face edge 4 of the lubricant cap 3.

Preferably, it can be provided that the anti-rotation means 7 comprises ribs 8 arranged in a cross shape, which enables a particularly good prevention of any rotation with respect to the coupling receiving area 2. The lubricant cap 3 can be held in a fixed position in the coupling receiving area 2 by means of the ribs 8 arranged in a cross shape. This results in low wear and tear of the lubricant cap 3 at the end face edge 4, since the lubricant cap 3 does not rotate with respect to the coupling receiving area 2. It is further advantageous here that the lubricating cap 3—unlike an embodiment with a groove and a projection of the lubricating cap which engages in this groove—cannot tilt, which reduces the wear of the lubricating cap 3 and enables easy replacement of the lubricating cap 3.

It may be preferably provided that the at least one rib 8 is arranged centrally between the slots 6. In particular, two or more than two slots 6 are respectively arranged at a distance from each other. Preferably, the at least one rib 8 is arranged at half of the distance between the slots 6, i.e. at half of the length along a latitude from one slot 6 to an adjacent slot 6, which is exemplarily shown in FIG. 3. This results in a good geometrical utilization of the surface of the lubricant cap 3.

It may also be preferably provided that the lubricant cap 3 has a plurality of anti-rotation means 7. For example, a plurality of ribs 8 can be arranged in a geometric pattern, or a plurality of individual ribs 8 arranged in a cross shape can be arranged on the lubricant cap 3.

For particularly good resistance of the lubricant cap 3 to rotation in the coupling receiving area 2, it can be provided that the anti-rotation means 7 projects from the lubricant cap 3 and that a form-fit receiving area 9 for the anti-rotation means 7 is arranged on the inner wall of the coupling receiving area 2.

In the case of ribs 8 as an anti-rotation means 7, the coupling socket 1 preferably has recesses which are opposite to the ribs 8 and which form receiving area 9 for the ribs 8. In an assembled state of the lubricant cap 3 in the coupling receiving area 2, the ribs 8 engage form-fittingly in the recesses of the coupling receiving area 2.

As previously mentioned, this form-fit receiving area 9 can be a receiving area for in particular grease-containing or pasty lubricants. If a coupling socket 1 does not have such a receiving area 9 for lubricants in its coupling receiving area 2, it may also be provided that the receiving area 9 is manufactured by a material-removing method, in particular by milling.

The recesses of the coupling receiving area 2 may in particular be elongated receiving areas 9.

Alternatively, it may also be provided that the anti-rotation means 7 is in the form of a plurality of projections arranged in particular along a longitude of the lubricating cap 3 and projecting from the lubricating cap 3. It may here be preferably provided that the coupling receiving area 2 has receiving areas which are opposite to the projections.

It may also be provided that the lubricant cap 3 is formed in one piece, whereby the lubricant cap 3 can be manufactured in a particularly simple manner. Preferably, it may further be provided that the lubricant cap 3 is made of an electrically and/or thermally insulating material.

In the context of the subject disclosure, features are typically introduced with an indefinite article "a, an". Unless the context indicates otherwise, the indefinite article is not intended to be a numerical indication, so that the disclosure is not limited to only one occurrence of the particular feature.

The invention claimed is:

1. A coupling socket for coupling to a coupling ball, comprising:
   a concave coupling receiving area with a main insertion direction for the coupling ball; and
   a substantially semispherical lubricant cap with an end face edge arranged in the coupling receiving area, a convex exterior of the lubricant cap being in surface contact with an inner wall of the coupling receiving area, a concave interior of the lubricant cap having a receiving area for the coupling ball; and
   an insertion opening of the coupling receiving area surrounded in an annular manner by an insertion aid, the coupling ball configured to be inserted into the insertion opening during a coupling process;
   wherein the end face edge of the lubricant cap, when viewed in the main insertion direction, is located behind the insertion aid;
   wherein the insertion aid completely covers the end face edge of the lubricant cap; and
   wherein the lubricant cap is hemispherical.

2. The coupling socket of claim 1, wherein the lubricant cap has at least one slot on the end face edge.

3. The coupling socket of claim 2, wherein the lubricant cap has a plurality of slots.

4. The coupling socket of claim 3, wherein the plurality of slots are arranged at equal distances from one another.

5. The coupling socket of claim 3, wherein:
   the lubricant cap has an anti-rotation means with respect to the coupling receiving area;
   the anti-rotation means includes at least one rib; and
   the at least one rib is arranged centrally between the slots.

6. The coupling socket of claim 2, wherein the lubricant cap is configured to be inserted in the coupling receiving area via the at least one slot and is configured to be removed from the coupling receiving area via the at least one slot.

7. The coupling socket of claim 1, wherein the lubricant cap has an anti-rotation means with respect to the coupling receiving area.

8. The coupling socket of claim 7, wherein the anti-rotation means includes at least one rib.

9. The coupling socket of claim 8, wherein the at least one rib is arranged along a longitude on the lubricant cap.

10. The coupling socket of claim 7, wherein the anti-rotation means comprises ribs arranged in a cross shape.

11. The coupling socket of claim 7, wherein:
    the anti-rotation means projects from the lubricant cap; and
    a form-fit receiving area for the anti-rotation means is arranged on the inner wall of the coupling receiving area.

12. The coupling socket of claim 1, wherein the insertion aid includes a sliding surface oblique to the main insertion direction, the sliding surface configured to enable the coupling ball to slide along the sliding surface during the coupling process until the coupling socket can be placed on the coupling ball in the main insertion direction.

13. The coupling socket of claim 1, wherein the lubricant cap comprises at least one polymer.

14. A coupling arrangement, comprising:
    the coupling socket of claim 1; and
    a coupling ball configured to be received in the coupling socket and removed from the coupling socket.

* * * * *